United States Patent Office 2,919,216
Patented Dec. 29, 1959

2,919,216

ELECTROLYTE FOR ELECTROCHEMICAL CELLS

Sidney A. Corren, Katonah, N.Y.

No Drawing. Application November 30, 1956
Serial No. 625,252

9 Claims. (Cl. 136—155)

This invention relates to electrolytes for electrochemical cell systems.

In electrochemical cell systems employing zinc anodes, inert electrodes such as carbon and ammonium chloride or mixed ammonium chloride-zinc chloride electrolytes, it is sometimes desired that the batteries be capable of withstanding storage for extended periods without deterioration. One cause of failure under storage conditions is chemical attack of the anode by the electrolyte.

It has been found that if the pH of the electrolyte is adjusted to fall within the range 8.0 to 8.8 the effect of the electrolyte on the anode is greatly minimized.

Accordingly, it is an object of this invention to provide an improved electrolyte for electrochemical cells.

A particular object of this invention is to provide an electrolyte non-reactive with zinc electrodes.

Other objects and advantages will be in part pointed out with particularity hereafter and in part be apparent from a consideration of the following description.

It has been discovered that if the pH of an ammonium chloride electrolyte is maintained in the range of about 8.0 to 8.8 electrochemical cells employing the electrolyte will have a longer storage life than if the pH is in its normal range of about 4 to 7.

Further, it has been found that if a buffer be added to the treated electrolyte a further improvement in stability is obtained.

In order to illustrate the invention several examples follow which disclose a sheet electrolyte claimed in my copending application entitled "Sheet Electrolyte for Batteries," Serial Number 625,363, now Patent No. 2,853,537. The sheet electrolyte may conveniently be incorporated in batteries of the type disclosed in the copending application of Arnold S. Louis, Serial Number 625,364, entitled "Moldable Miniature Battery" now Patent No. 2,843,649.

It should be clearly understood that this invention may be employed in electrochemical cells having similar electrodes although the electrolyte form may be other than that disclosed in the referenced applications. What is important is the presence or absence of chemical attack by the electrolyte on the anode.

*Example 1*

Electrolyte sheeting was made using the following materials:

Parts

I. Fiber glass cloth 0.003" thickness, Hess-Goldsmith & Co., No. 112.
II. Polyvinyl alcohol, E. I. du Pont de Nemours
 & Co., "Elvanol" 72–60 _____ 100
 Dimethylol urea _____ 10
 Ammonium chloride _____ 1
 Water _____ 1500
III. Polyvinyl alcohol, E. I. du Pont de Nemours
 & Co., "Elvanol" 70–05 _____ 10
 Graphite (Dixon Grade 200–10) _____ 100
 Water _____ 500
IV. Water _____ 50
 Ammonium chloride _____ 1

Two sheets of fiber glass (I) approximately 2' x 3' are washed in dilute nitric acid and then thoroughly rinsed. The two sheets are then stretched over a heated frame. The fiber glass is dried whereupon the polyvinyl alcohol solution II is evenly applied to the fiber glass lay-up.

Upon the completion of each coat, the lay-up is heated to approximately 150° F. and each successive layer is dried. About three coats on the fiber glass accomplish thorough impregnation with polyvinyl alcohol. Following the impregnation, each side of the lay-up is given a brush coat of the polyvinyl alcohol solution to bring the thickness of the coated glass cloth to 0.009"±0.001". A final coating of a graphite-polyvinyl alcohol dispersion (III) is applied to one side to provide a good contact to the cathode. The finished sheet is heated at 250° F. for one hour. The sheet is then cut into pieces of suitable size for use in the electrochemical cell.

Prior to use in the cell the coated glass fiber sheet is soaked for at least 24 hours in the electroylte (I). The electrolyte sheet is pressed to remove excess electrolyte just prior to use and in this form can be readily die cut to any desired shape.

The electrolyte sheet is then incorporated in a cell as described in the above referenced copending application of Arnold S. Louis.

The resulting cell was tested by measuring the output current obtained under short circuit conditions. A current flow of 5 milliamperes was noted. After 4 days storage at 130° F. the same test showed no short circuit current. The cell was opened and the anode was found to be severely attacked.

*Example 2*

The procedure of Example 1 was repeated using in place of the electrolyte IV the following composition:

Gr.

V. Water _____ 50
 Ammonium chloride _____ 1

Ammonium hydroxide 6 Normal was added to bring the pH of the solution to 8.4.

The resulting cell was tested by measuring the output current immediately after manufacture and after storage at 130° F. Under test the fresh cell yielded an output current of 10 milliamperes; and after six weeks of storage showed a current output of 5 milliamperes. When the anode was removed it was found to show but slight signs of attack.

*Example 3*

The procedure of Example 1 was repeated using in place of the electrolyte IV the following composition:

Gr.

VI. Water _____ 115
 Ammonium chloride _____ 3
 Zinc chloride _____ 2
 Ammonium hydroxide 6 Normal to bring pH
 to 8.8.

An electrochemical cell was made and tested in accordance with the procedure of Example 1.

Immediately after manufacture the short circuit current was 8 milliamperes. After storage at 130° for 4 weeks the short circuit was 3 milliamperes. The cell was cut open to permit examination of the anode, evidence of slight attack was noted.

Example 4

The procedure of Example 1 was repeated using the following electrolyte in place of IV.

| | Gr. |
|---|---|
| Water | 50 |
| Ammonium chloride | 1 |
| Ammonium hydroxide 6 Normal to bring pH to 8.5. | |
| Sodium ammonium phosphate | 0.1 |

The results were comparable to that of Example 2 but visual examination after the storage at 130° F. for eight weeks indicated less attack of the anode after the storage period.

Example 5

The procedure of Example 4 was repeated with an equivalent amount of ammonium acetate used as the buffer in place of the ammonium phosphate. The results were comparable with that obtained in Example 4 both as to battery output and chemical attack of the anode.

In summary, it has been found that electrolytes formed of zinc or ammonium chloride or their combinations are substantially improved by adjusting the pH within the range 8.0 to 8.8.

While there has been disclosed herein in accordance with the statutes the best mode presently contemplated for carrying out the invention it is to be understood that variations and substitutions in the neutralizing and buffering agents may be made by those skilled in the art without departing from the spirit of the invention. Accordingly I wish to be limited only by the scope of the appended claims.

What is claimed is:

1. An improved ammonium chloride electrolyte characterized by the presence of a quantity of ammonium hydroxide sufficient to provide a pH in the range of 8.0 to 8.8.

2. An electrolyte for electrochemical cells comprising an ammonium chloride solution having a pH in the range 8.0 to 8.8 and a minor proportion of a buffer.

3. An electrolyte comprising ammonium chloride solution having a pH in the range of about 8.0 to 8.8 and a minor proportion of sodium ammonium phosphate.

4. An electrolyte comprising ammonium chloride solution having a pH in the range of about 8.0 to 8.8 and a minor proportion of ammonium acetate.

5. An electrolyte comprising a mixture of ammonium chloride and zinc chloride solutions having pH in the range 8.0 to 8.8.

6. An electrolyte comprising a mixture of ammonium chloride and zinc chloride solutions and a minor proportion of ammonium hydroxide sufficient to raise the pH within the range 8.0 to 8.8.

7. The electrolyte of claim 6 wherein there is present a minor proportion of a buffer.

8. The electrolyte of claim 7 wherein said buffer is sodium ammonium phosphate.

9. The electrolyte of claim 7 wherein said buffer is ammonium acetate.

References Cited in the file of this patent

UNITED STATES PATENTS

| 219,631 | Fitch | Sept. 16, 1879 |
| 1,279,280 | Csanyi | Sept. 17, 1918 |
| 1,437,553 | Reed | Dec. 5, 1922 |
| 1,503,993 | Mummery | Aug. 5, 1924 |
| 1,839,498 | Porth | Jan. 5, 1932 |
| 2,569,491 | Otto | Oct. 2, 1951 |

FOREIGN PATENTS

| 173,251 | Great Britain | Jan. 3, 1922 |

OTHER REFERENCES

Vinal: "Storage Batteries," 4th ed., 1955, Wiley & Sons, Inc., pp. 159–165.